US012761170B2

(12) United States Patent
Osswald et al.

(10) Patent No.: US 12,761,170 B2
(45) Date of Patent: Oct. 13, 2026

(54) APPARATUS AND PROCESS FOR DETECTING A TARGET GAS USING MULTIPLE DETECTOR-COMPENSATOR PAIRS

(71) Applicant: Drager Safety AG & Co. KGaA, Lübeck (DE)

(72) Inventors: Jürgen Osswald, Lübeck (DE); Livio Fornasiero, Lübeck (DE); Tom Pöthig, Lübeck (DE)

(73) Assignee: DRAGER SAFETY AG & CO. KGAA, Lübeck (DE)

( * ) Notice: Subject to any disclaimer, the term of this patent is extended or adjusted under 35 U.S.C. 154(b) by 230 days.

(21) Appl. No.: 18/739,430

(22) Filed: Jun. 11, 2024

(65) Prior Publication Data

US 2024/0418664 A1 Dec. 19, 2024

(30) Foreign Application Priority Data

Jun. 15, 2023 (DE) ..................... 10 2023 115 582.2

(51) Int. Cl.
*G01N 25/22* (2006.01)

(52) U.S. Cl.
CPC .................................... *G01N 25/22* (2013.01)

(58) Field of Classification Search
None
See application file for complete search history.

(56) References Cited

U.S. PATENT DOCUMENTS

| | | | | |
|---|---|---|---|---|
| 2004/0241870 | A1* | 12/2004 | Miller | G01N 27/16 436/151 |
| 2005/0155405 | A1 | 7/2005 | Sasaki et al. | |
| 2018/0335411 | A1* | 11/2018 | Zanella, Sr. | G01N 33/0027 |
| 2020/0393432 | A1* | 12/2020 | Swanson | G01N 27/14 |
| 2023/0152289 | A1 | 5/2023 | Swanson et al. | |

FOREIGN PATENT DOCUMENTS

| | | | |
|---|---|---|---|
| DE | 102011007281 | A1 | 12/2011 |
| DE | 102022106689 | A1 | 10/2022 |
| WO | 2009008258 | A1 | 1/2009 |
| WO | 2009013103 | A1 | 1/2009 |
| WO | 2020251931 | A1 | 12/2020 |

* cited by examiner

*Primary Examiner* — Suman K Nath
(74) *Attorney, Agent, or Firm* — McGlew and Tuttle, P.C.

(57) ABSTRACT

A gas detection device (100) and a gas detection process are configured to detect the presence of a combustible target gas in a gas sample and/or to measure the concentration of the target gas in the gas sample. A detection arrangement (DA) includes at least two detectors (10.1, . . . ) and at least one compensator (11). This forms two different detector-compensator pairs (P.1, . . . ). A compensator belongs to two different pairs. Each pair can be switched on and off independently of any other pair. Only one pair is switched on at any time. A heated detector (10.1, . . . ) oxidizes combustible target gas. A measuring unit measures a detection variable for each pair. An evaluation unit (6) derives the target gas concentration from the detection variable. During operation, each pair is switched on one after the other, the respective detection variable is measured and the pair is switched off again.

16 Claims, 9 Drawing Sheets

(STATE OF THE ART)

APPARATUS AND PROCESS FOR DETECTING A TARGET GAS USING MULTIPLE DETECTOR-COMPENSATOR PAIRS

CROSS REFERENCE TO RELATED APPLICATIONS

This application claims the benefit of priority under 35 U.S.C. § 119 of German Application 10 2023 115 582.2, filed Jun. 15, 2023, the entire contents of which are incorporated herein by reference.

TECHNICAL FIELD

The invention relates to a gas detection device and a gas detection process which are configured to detect the presence of at least one combustible target gas in a gas sample and/or to determine the concentration of the target gas in the gas sample.

BACKGROUND

Gas detection devices comprising a detector and a compensator have become known. The detector and the compensator are heated by applying an electrical voltage to each. The heated detector oxidizes combustible target gas. A detection variable that correlates with the target gas concentration is measured. The heated compensator is able to oxidize combustible target gas to a lesser extent than the detector or even not at all. Because ideally the detector and the compensator react in the same way to ambient conditions, the compensator makes it possible to compensate for the influence of ambient conditions on the detection variable. Such a device is also known as a heat tone sensor. In order to oxidize sufficient target gas even at lower temperatures, the detector often includes catalytic material. Such a device is therefore also referred to as a catalytic sensor.

SUMMARY

It is an object of the invention to provide a gas detection device and a gas detection process which, with the same energy consumption, achieve a higher reliability and/or, with the same reliability, a lower energy consumption than known gas detection devices and gas detection processes each having a detector and a compensator.

The problem is solved by a gas detection device with features according to the invention and by a gas detection process with features according to the invention. Advantageous embodiments of the gas detection device according to the invention are, where appropriate, also advantageous embodiments of the gas detection process according to the invention and vice versa.

The gas detection device according to the invention is capable of determining the presence of at least one combustible target gas in a gas sample. Alternatively or additionally, the gas detection device is capable of determining the concentration of the target gas or at least one target gas in the gas sample. Optionally, the gas detection device is able to determine the summed concentrations of multiple target gases in the gas sample. The gas detection process according to the invention is carried out using a gas detection device according to the invention.

The gas detection device according to the invention comprises a detection arrangement. The detection arrangement includes at least three detection units. The term "detection unit" may denote a detector or a compensator. At least two different detection units of the detection arrangement are detectors. At least one further detection unit is a compensator. Therefore, the detection arrangement provides at least two different detector-compensator pairs. Each detector-compensator pair comprises exactly one detector and exactly one compensator and is sometimes abbreviated as a "pair".

According to the invention, the number of detectors is greater than the number of compensators. At least one compensator therefore belongs to at least two different detector-compensator pairs. It is even possible for a compensator to belong to at least three different detector-compensator pairs.

The gas detection device according to the invention is capable of switching on each pair, i.e. energizing the pair, and switching off the pair again, independently of any other pair. According to the invention, at most one detector-compensator pair is switched on at any time during an operation. The or every other detector-compensator pair is switched off. It is possible that in an idle state of the gas detection device each pair is switched off. It is also possible that a first pair is switched on in a first period, then no pair is switched on in an intermediate period, and then a second pair is switched on, wherein the second pair is different from the first pair or is the same pair as the first pair.

If a pair is switched on, an electrical voltage is permanently or at least temporarily present at the detector. In addition, an electrical voltage is applied to the compensator permanently or at least intermittently. The term "intermittent" refers in particular to the embodiment in which the electrical voltage is applied in pulsed form, which saves electrical energy compared to an embodiment in which the voltage is applied continuously. The pulse frequency, the pulse duration, and/or the duty cycle of the pulsed voltage applied to a detector may correspond to or differ from the pulse frequency, the pulse duration and/or the duty cycle of the voltage applied to a compensator.

Preferably, a pair is switched on by applying an electrical voltage to both the detector and the compensator, i.e. energizing the pair. The two electrical voltages can have the same value or two different values. The electrical voltage that is permanently or temporarily applied to a detection unit of a switched-on pair causes the detection unit to heat up.

A detection unit comprises a heating segment. If voltage is applied to the detection unit, electric current flows, and this heating segment is heated. A detector differs from a compensator as follows: Heating the detector causes oxidation of the target gas—of course only if there is an oxidizable target gas with a sufficiently high concentration in the vicinity of the detector. Oxidation releases heat energy and the detector is heated further. Heating the compensator, on the other hand, causes less oxidation than heating a detector. In one embodiment, heating the compensator causes no oxidation of the target gas at all.

Each detection unit and therefore each detector-compensator pair has a detection variable. This detection variable correlates with the thermal energy released by the detector oxidizing combustible target gas and therefore with the target gas concentration. In one embodiment, the detection variable of a pair depends on the respective electrical resistance or other electrical variable of the two detection units. As is known, the electrical resistance of an electrically conductive component depends in many cases on the temperature of the component. The respective temperature itself or the supplied electrical power, which is required to heat the heating segments, can also be a detection variable. As a rule, all detector-compensator pairs have the same detection variable, although the values of this detection variable differ or at least may vary for different pairs. If a detection unit of a pair oxidizes target gas, the detection unit heats up further and as a result the value of the detection variable of the pair changes. An example: As is well known, the electrical resistance of an electrically conductive component increases with the temperature of the component. Another example: Because heat energy is released when combustible target gas is oxidized, the greater the target gas concentration before oxidation, the less electrical power is required to bring a detector to a certain temperature.

The detection variable of a detector-compensator pair is influenced by the respective temperature of the two detection units. Oxidizing the target gas releases heat energy. The released heat energy and therefore the detection variable correlating with the released heat energy are an indicator of the target gas concentration.

The gas detection device according to the invention further comprises a measuring unit. This measuring unit is able to measure for each switched-on detector-compensator pair which value the detection variable currently assumes for this pair. For example, the measuring unit measures the respective voltage at the detector and the compensator or at a bridge voltage of a Wheatstone measuring bridge. Preferably, the measuring unit generates a respective time course of the detection variable for each pair.

The gas detection device according to the invention further comprises a signal-processing evaluation unit which receives a signal from the measuring unit and automatically evaluates (processes) the signal. For each pair that is switched on, the evaluation unit therefore receives at least one measured value that the detection variable assumes for the pair, for example the value that the detector of the pair assumes, as well as a measured value that the detection variable assumes for the compensator of the pair, or the value that an optional bridge circuit of the pair assumes. Using the or at least one value for the pair, e.g. the two values for the detector and for the compensator, the evaluation unit decides whether or not target gas with a concentration above a given lower concentration threshold is present and/or derives an estimated value (an indicator value) for the target gas concentration.

If, for example, an indicator of electrical resistance is measured as a detection variable, in many cases the greater the electrical resistance of the detector is, the greater is the estimated value for the target gas concentration, and sometimes the smaller the electrical resistance of the compensator is, the greater is the estimated value. In particular, the greater the difference between the two electrical resistances is, the greater is the estimated value.

As already mentioned, each detector-compensator pair can be switched on and off again independently of any other detector-compensator pair. When the pair is switched on, an electrical voltage is applied to both the detector and the compensator of the pair, preferably pulsed. When the pair is switched off, no electrical voltage is present, neither at the detector nor at the compensator, not even pulsed.

The gas detection device can perform the following steps for each pair:

switch on the pair, effect that the detection variable of the switched-on pair is measured and depending on the measured detection variable decide about the presence or the concentration of target gas, and switch off the pair again.

The feature according to the invention that at most one pair is switched on saves electrical energy compared to an embodiment in which at least sometimes two pairs are switched on simultaneously.

Ambient (environmental) conditions also generally influence the temperature of the switched-on detector, in particular the temperature, humidity and air pressure in the environment. Ideally, these ambient conditions have the same effect on the detector as on the compensator. Thanks to the compensator, the influence of the ambient conditions can be compensated to a certain extent by the configuration and/or by calculation using the value that the detection variable assumes for the compensator or for the pair.

Substances, especially siloxanes and $H_2S$, can be deposited on the surface of a detector. The detector is “poisoned”. As a result, the detector is less able to oxidize combustible target gas, and with the same target gas concentration, the detector releases less and less thermal energy with increasing poisoning, in extreme cases no thermal energy is released at all. Because at least two detectors are present according to the invention, the service life (life time) of the gas detection device can be extended compared to an embodiment with only one detector.

It is possible, but not necessary thanks to the invention, to position a filter between the detection arrangement and a spatial area to be monitored, whereby this filter reduces the inflow of harmful gases. Such a filter often reduces the usefulness (possible uses) of a gas detection device because the filter can reduce or even prevent the inflow of some target gases and the gas detection device is therefore unable to detect these target gases. In addition, a filter can become clogged and allow a gas sample to pass through more slowly or not at all.

As a rule, the compensator or each compensator is less strongly poisoned than each detector. The main reason is that the compensator oxidizes target gas to a smaller extent than the detector and is therefore less strongly poisoned by deposits. In particular for this reason, the feature according to the invention is advantageous that the same compensator of the gas detection device is a component of at least two different pairs. The gas detection device according to the invention requires fewer detection units and often also less electrical energy than a gas detection device comprising multiple detectors and as many compensators as detectors.

In some cases, target gas with a sufficiently high concentration can still be detected even if each detector is heavily poisoned. In one embodiment, the value that the detection variable assumes for the compensator is measured. Many target gases have a greater thermal conductivity than air, so that the compensator is cooled by a target gas, which changes the detection variable of the compensator and thus the or a detection variable of the pair, even if the detector is completely poisoned. However, the influence of the reduced thermal conductivity is much smaller than the influence of the released thermal energy on the detector due to the oxidation of target gas.

According to the invention, there are more detectors than compensators. This feature has the following advantages in particular:

As already explained, each detector usually poisons faster than the compensator or each compensator, in particular because deposits form on the detector as a result of oxidation. Therefore, in many cases, this configuration leads to a longer service life and/or lower energy consumption than a gas detection device that has as many compensators as detectors.

It is possible that the detection units are flat components that are mounted on a circuit board in particular. In many cases, the more surface area the components take up on this circuit board, the higher are the manufacturing costs. The feature according to the invention that there are fewer compensators than detectors saves space and therefore often manufacturing costs compared to a gas detection device comprising just as many compensators as detectors and just as many detectors as a gas detection device according to the invention.

Embodiments of the invention define various options for the order in which and the frequency with which pairs are switched on and off.

In one embodiment, the detector-compensator pairs are switched on and off during a period of use in such a way that, measured over the entire period of use, all pairs are switched on for the same length of time and switched off for the same length of time. In another embodiment, a first detector-compensator pair is switched on for a longer time period than a second detector-compensator pair. In a further embodiment or modification, the first pair is switched on N1 times and the second pair N2 times during the period of use. N1 and N2 are two numbers, N2 is at least 1, preferably at least 2, and N1 is greater than N2. Preferably, the same amount of time elapses between the time at which a pair is switched on and the time at which this pair is switched off again. The pair is therefore always switched on for the same activation period. However, different activation periods are also possible for one pair or for two different pairs.

In one embodiment, the gas detection device performs at least once during the period of use a sequence comprising the following steps: First, the first detector-compensator-pair is switched on N times and switched off again, while the second detector-compensator-pair remains switched off throughout. Then the second pair is switched on once and switched off again. Here, N is a number greater than 1, which means that the first pair is generally subjected to more stress (strain) than the second pair.

In many cases, these configurations result in the detector of the second pair being poisoned more slowly than the detector of the first pair. If the detector of the first pair is so heavily poisoned that it no longer oxidizes sufficiently reliably, in many cases a target gas can still be detected with the second pair. As already explained, the same compensator can belong to both the first pair and the second pair.

Multiple embodiments have been described above in which the first pair is switched on for longer than the second pair. The first pair is therefore also more heavily stressed than the second pair, and at least its detector is in many cases more heavily poisoned than the detector of the second pair. Preferably, the two pairs provide a respective target gas concentration value (an estimate or indicator of the target gas concentration). Generally, a target gas concentration does not change significantly between an activation period of the first pair and the subsequent activation period of the second pair.

In one embodiment, the evaluation unit is able to compare these estimations of the target gas concentration provided by the two pairs with each other. If these two concentration value estimations differ from each other by more than one threshold, this is an indication that one pair is defective. In response, the evaluation unit-optionally after a check-triggers one of the following two steps:

The respective detection variable values of the two pairs are further used. However, the value of one parameter is changed automatically. The evaluation unit uses this detection variable value to decide on the presence of target gas depending on the measured detection variable value of the first pair and/or to measure the target gas concentration and derive a target gas concentration estimate.

The first pair is switched off and not switched on again until it has been checked or replaced.

This configuration allows the gas detection device to automatically check itself with a relatively high degree of reliability. If the two target gas concentration estimates of the two pairs differ by more than the threshold, this is an indication that a detector is relatively heavily poisoned. In many cases, a plausibility check can automatically determine whether the deviation between the two estimated values is caused by poisoning of a detector or by another fault, e.g. an interrupted electrical contact. Because the detector of the first pair is switched on longer than the detector of the second pair according to the embodiment, the detector of the first pair is usually the poisoned detector and not the detector of the second pair. Any other error can of course affect the first pair or the second pair.

In one embodiment, at least one pair has a detection variable that is influenced by both the temperature of the detector and the temperature of the compensator. This embodiment applies if a bridge circuit is used, e.g. In another embodiment, at least one pair has two different detection variables, namely a detection variable of the detector and a detection variable of the compensator. These two detection variables can vary independently of each other over time. The measuring unit is capable of measuring both detection variables.

In one embodiment, when a pair is switched on, an electrical voltage, preferably a pulsed electrical voltage, is applied continuously to both the detector and the compensator. In a different embodiment, when a pair is switched on, an electrical voltage is only temporarily present at the detector and an electrical voltage is only temporarily present at the compensator. If an electrical voltage is present at the detector, the detection variable of the detector is measured. If an electrical voltage is applied to the compensator, the detection variable of the compensator is measured. The two measured values of the two detection variables are then compared with each other in order to decide on the presence of a target gas and/or to determine the target gas concentration. In some cases, this embodiment places less strain on the detector and/or saves electrical energy compared to an embodiment in which an electrical voltage is at least temporarily applied simultaneously to both the detector and the compensator.

In a further embodiment of this configuration, at one time point an electrical voltage is only present at one of the two detection units, i.e. either at the detector or at the compensator, but not at both detection units, even when the pair is switched on. The electrical voltage can also be pulsed in this configuration. This configuration saves electrical energy.

According to the invention, one pair is switched on during an activation period, and the or each other pair is switched off during this activation period. In one implementation of the embodiment just described, an electrical voltage is applied to the compensator for a shorter time during this activation period than to the detector. It is particularly preferable that the measuring unit measures the detection variable for the compensator only once during the activation period, but measures the detection variable for the detector at least two times. This implementation saves even more electrical energy and takes into account the fact that the compensator is essentially influenced by ambient conditions and these ambient conditions generally change only slowly, whereas a target gas concentration and thus the detection variable of the detector can change more quickly.

Preferably, the detection arrangement extends in a plane. According to this preferred embodiment, the maximum dimension of the detection arrangement perpendicular to this plane is at most 20% of the maximum extension in the plane. Particularly preferably, the vertical dimension is at most 10%, especially at most 5%. For example, a circuit board extends in this plane, and the detection units are arranged on and/or in this circuit board. In a viewing direction perpendicular to the plane, the detection units are arranged without overlapping, preferably in at least one row, optionally in a rectangle with at least two rows. Preferably the or every compensator is arranged between two respective detectors. In one embodiment the detection units are arranged in a rectangle with K rows and L columns wherein K>=3 and L>=3 is valid and wherein the or every compensator is arranged in the interior of this rectangle. It is also possible that the detection units are distributed over at least two circuit boards. The two boards can extend in the same plane or in two different planes, whereby the two different planes are preferably parallel to each other. Preferably, a gas sample flows around the two boards.

Such a flat configuration reduces the thermal mass of the detectors and compensators compared to e.g. spherical components (pellistors). As a result, the detection units reach a respective desired operating temperature more quickly. This in turn makes it possible to switch on the pairs for shorter time periods, for example with shorter pulses and/or longer intervals between the individual pulses and/or smaller duty cycles. This in turn reduces the consumption of electrical energy, which is particularly desirable for a device with its own power supply. Alternatively, a higher sampling rate can be achieved with the same energy consumption. In addition, this configuration often saves installation (construction) space and/or weight.

In many cases, the flat configuration just described in conjunction with a pulsed voltage with shorter pulses causes a detector to have a longer service life because it is less poisoned compared to a configuration in which an electrical voltage is permanently applied to the switched-on detector or the pulses must be longer in order to sufficiently heat a spherical component, for example. The detection arrangement is also often easier to produce than a detection arrangement with spherical detection units, for example. This applies in particular to highly automated production.

In one embodiment, all detection units are arranged in the same plane. Because the detection units are arranged in this plane without overlapping, a gas sample that is to be analyzed for the target gas or a target gas reaches all detection units relatively quickly. If two detection units were to overlap, in many cases more time would elapse before the target gas reached all detection units. As a result, the detection arrangement would require more time to provide a reliable measurement result. In addition, in some cases the flow of gas to the detection units would be more difficult, which can lead to incorrect measurement results.

According to the invention, the detection arrangement comprises two detector-compensator pairs. In a preferred embodiment, the detection arrangement additionally comprises a third detector-compensator pair, which also comprises exactly one detector and exactly one compensator. In total, the detection arrangement according to this embodiment comprises at least three detectors and at least one compensator.

The first detector-compensator pair provides a first target gas concentration estimate. The second pair provides a second target gas concentration estimate. The evaluation unit is able to compare these two estimated values with each other. The third pair preferably remains switched off if these two estimated values do not differ from each other by more than a predetermined threshold. How large this threshold is can depend on the time that elapses between the state in which the first pair is switched on and the second pair is switched off, and the state in which the second pair is switched on and the first pair is switched off. If the two estimated values differ by more than this threshold, the gas detection device causes the third pair to be switched on.

The third pair is therefore in reserve and is not switched on and therefore not used as long as the two estimated values of the first pair and the second pair do not differ from each other by more than the threshold. The third pair is therefore not poisoned for this period during which the third pair is not switched on. If the difference is below the threshold, both the first pair and the second pair are intact. The third pair is not poisoned as long as it remains switched off. If the two estimated values differ by more than the threshold, this is an indication that the more heavily loaded detector of the first and/or second pair is heavily poisoned. In this situation, the third pair is used at least temporarily. In many cases, the measured value of the detection variable of the third pair can be used to decide whether the detection variable value of the first pair or the detection variable value of the second pair is correct and therefore the pair that provides a presumably incorrect detection variable value must be switched off and/or checked. For example, the first pair and/or the second pair can be checked or even readjusted/calibrated.

Each detector of these at least three pairs has an effective surface. This effective surface comes into contact with a gas sample. The detector is capable of oxidizing a target gas in this gas sample by means of the effective surface—of course only if the gas sample comprises at least one oxidizable target gas. Preferably, the detector of the third pair has a larger effective surface area than the detector of the first pair and larger than the detector of the second pair. In many cases, the detector of the third pair is therefore able to provide a measured value with a particularly high reliability.

In one embodiment, a respective zero value is specified for each detector-compensator pair. The zero value is set or determined in a previous calibration, for example. The detection variable of the pair assumes this zero value if no target gas is present in the vicinity of the pair. In many cases, the detection variable of a pair does not assume the value zero even if there is no target gas in the vicinity. In other words, the zero value is usually not equal to zero. A common reason is the following: The zero values of the detector and the compensator of a pair differ from each other, especially due to configuration and/or manufacturing differences. Thanks to the zero value, it is not necessary to bring these differences to zero in advance.

A detector-compensator pair that is switched on provides a measured value for the detection variable. The evaluation unit preferably uses the difference between the measured value and the specified, e.g. stored, zero value of this pair as the detection variable value. The evaluation unit determines the presence of the target gas and/or measures the target gas concentration depending on this difference. In one embodiment, the evaluation unit is able to calculate the difference between the value that the detection variable currently assumes and the zero value of the detection variable for each detection unit. This means that there are two differences for each pair that is switched on. It is also possible to specify a zero value for a bridge circuit.

This configuration with the zero values eliminates the need to implement and manufacture the detection units with the same configuration in such a way that the detection variable assumes the same value for each detection unit in the absence of target gas and under the same ambient conditions. Instead, the zero values compensate to a certain extent for configuration-related differences.

In one embodiment, the gas detection device comprises a housing (enclosure, case) which accommodates at least the detection arrangement and the measuring unit, optionally an own power supply unit. The evaluation unit can also be located inside this housing. It is also possible for the evaluation unit to be spatially remote from the housing and connected to the measuring unit via a data link, in particular via a data link by radio waves or by cable. This configuration eliminates the need to arrange the evaluation unit inside the housing. It is possible for the same evaluation unit to be connected to different gas detection devices.

In one embodiment, the gas detection device comprises its own power supply unit. In another embodiment, the gas detection device can be connected to a stationary power supply network.

In one embodiment, the gas detection device comprises an output unit that outputs a measurement result in at least one form that can be perceived by a human being, in particular visually, acoustically and/or haptically (by vibrations). In another embodiment, the gas detection device comprises a communication unit that is capable of transmitting a message with a measurement result to a spatially remote receiver. These two embodiments can be combined with each other.

The invention is described below with embodiment examples. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
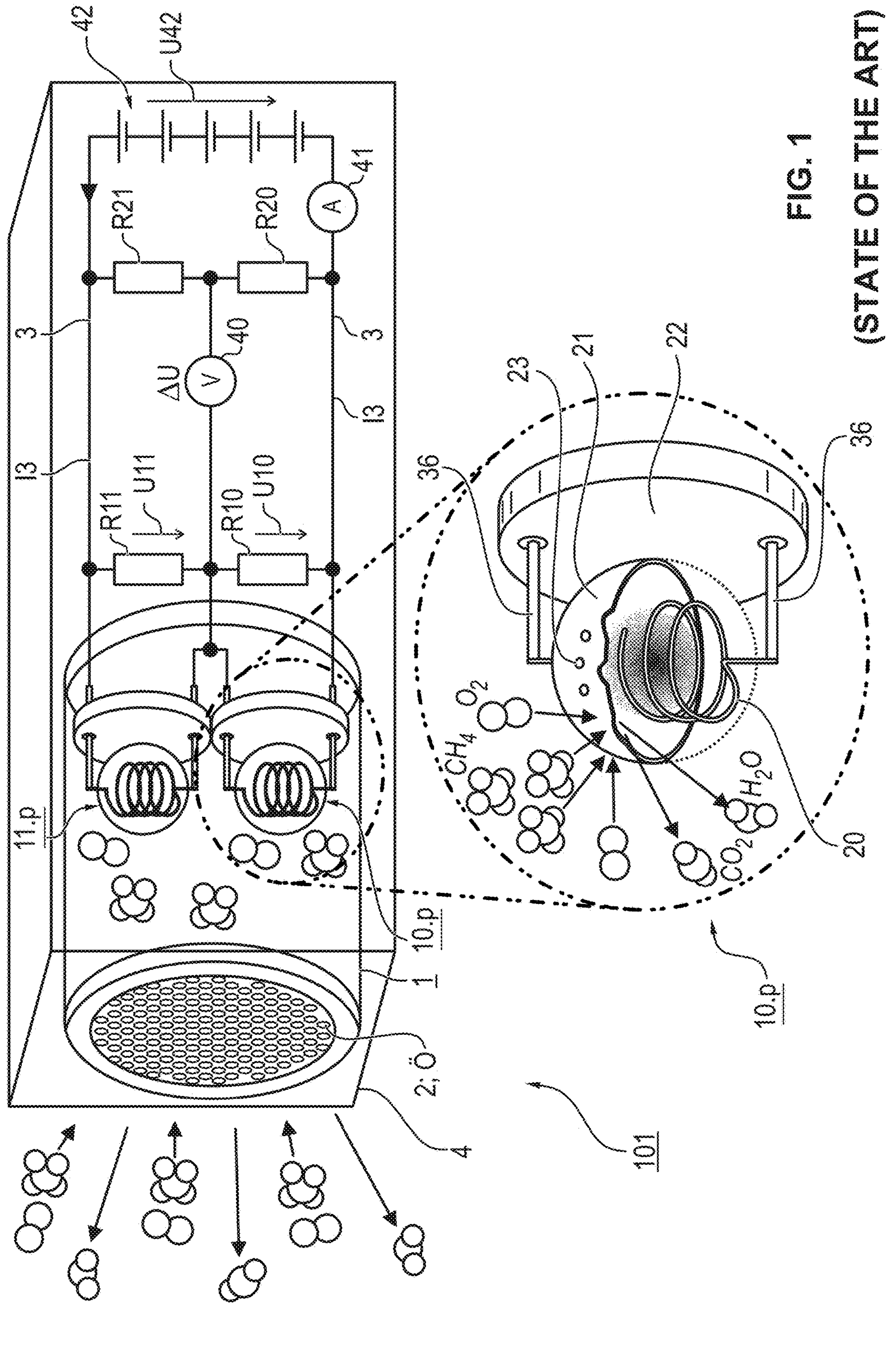
FIG. 1 is a perspective schematic view showing a gas detection device with a detector and a compensator, both of which are configured as pellistors, whereby the bridge voltage is measured.

Referring to the drawings, the gas detection device according to the invention is used to detect at least one combustible gas and/or to determine the concentration of the combustible gas. This combustible gas is hereinafter referred to as the "target gas". In one embodiment, if multiple target gases are present, the sum of the target gas concentrations is determined.

In one application, the gas detection device is used to monitor a spatial area and to detect at least one combustible target gas and/or to determine the target gas concentration or to ensure that no combustible target gas above a detection threshold is present. The spatial area is, for example, a refinery or other production plant, the interior of a building, a mine, the interior of a vehicle or the interior of an aircraft. The combustible gas is, for example, methane ($CH_4$).

In another application, the gas detection device is used to test a subject for a substance that can be detected in exhaled air, in particular alcohol. As is known, the air exhaled by a subject contains breath alcohol, provided that the subject has consumed alcohol and that this alcohol has not yet been completely broken down in the subject's body. In this case, alcohol is still present in the subject's blood and/or lungs and mouth. In this application, the subject injects (expels) a breath sample into a mouthpiece of the gas detection device. At least part of the delivered breath sample reaches the inside of the gas detection device. In this application, gaseous breath alcohol is the combustible target gas.

In one embodiment, the gas detection device is a portable device that a person can hold in one hand or attach to his/her clothing or protective equipment. For example, a user carries such a gas detection device with him/her while he/she is in an area where at least one flammable target gas may be present. Or the gas detection device is held in front of a subject's mouth so that the subject injects a breath sample.

Preferably, in the first application, and optionally also in the second application, the gas detection device generates an alarm in at least one form that a person can perceive when a target gas concentration occurs above a predetermined threshold. The alarm is emitted visually, acoustically and/or haptically (by vibrations), for example. In these applications, the gas detection device comprises its own power supply unit.

FIG. 1 shows an example of a gas detection device 101 as known from the state of the art. The principle described below with reference to FIG. 1 can also be applied to a gas detection device according to the invention. The principle has become known under the names "heat tone sensor" and "catalytic sensor".

In the embodiment shown in FIG. 1, an outer housing 4, for example made of a hard plastic, surrounds a heat-resistant inner cylindrical housing 1, for example made of steel. A gas sample can enter the interior of the inner housing 1 through an opening Ö with a flame arrester (flame protection) 2, for example by the gas sample being sucked in or by diffusion.

The gas detection device 100 comprises a detector 10.*p* and a compensator 11.*p*. In the following, the generic term "detection unit" is used for both a detector and a compensator. The component of the gas detection device 100 that comprises the detector or each detector as well as the compensator or each compensator and the electrical contacts is referred to as the "detection arrangement" DA. Preferably, the detection arrangement DA is located entirely inside the inner housing 1.

The detector 10.*p* comprises an electrically conductive component with a heating segment 20 and with two electrical contacts 36, the two electrical contacts 36 being mounted on a plate 22. In the implementation shown, the heating segment 20 has the form of a spiral wire and is preferably made of a material which ideally does not react chemically with a target gas to be detected, i.e. is inert. A ceramic coating 21 surrounds the heating segment 20 and has in the shown implementation the shape of a solid sphere. A catalytic coating, indicated by circles 23, is applied to the outer surface of the ceramic coating 21. The catalytic material used is, for example, platinum or palladium or another suitable metal or alloy. Preferably, the ceramic coating 21 is porous so that the gas sample can also reach the inside of the ceramic coating 21.

When an electrical voltage is applied to the electrical contacts 36, a current flows through the heating segment 20 and the heating segment 20 heats up. The heated heating segment 20 oxidizes a combustible target gas inside the inner housing 1, in interaction with the catalytic material 23 in the ceramic coating 21. As an example, it is indicated that methane is converted into carbon dioxide and water during oxidation, i.e. that the chemical reaction $$CH_4+2O_2 \rightarrow 2H_2O+CO_2$$

takes place. Heat energy is released during this chemical reaction. This released heat energy further increases the temperature of the heating segment 20. The temperature of the heating segment 20 is therefore an indicator of the concentration of target gas inside the housing 1.

An indicator of the temperature of the heating segment 20 is measured. In one embodiment, the electrical resistance of the heating segment 20 is measured. As is known, the electrical resistance of many electrically conductive materials changes with temperature. As a rule, the greater the temperature, the greater the electrical resistance.

However, the temperature of the heating segment 20 is not only influenced by the target gas concentration, but also by ambient conditions, in particular by the ambient temperature and/or by the temperature of the gas sample inside the inner housing 1. For this reason, the compensator 11.*p* is also arranged inside the housing 1. The compensator 11.*p* also comprises a heating segment and a ceramic coating, but in the embodiment example no catalytic coating and in another possible embodiment a lower catalytic coating. Therefore, the compensator 11.*p* is not able to oxidize any combustible target gas or at least do so more slowly and/or to a less extent. The ambient conditions, on the other hand, ideally have the same effect on the compensator 11.*p* as on the detector 10.*p*. Therefore, the compensator 11.*p* makes it possible to mathematically compensate for the influence of ambient conditions on the detector 10.*p* to a certain extent.

In the embodiment shown in FIG. 1, the gas detection device 100 also comprises the following components:

- a power supply unit 42, for example a set of rechargeable batteries (accumulators),
- an electrical resistor R20, which is connected in parallel to the detector 10.*p*,
- an electrical resistor R21, which is connected in parallel to the compensator 11.*p*,
- an electrical cable 3,
- a voltage sensor 40 and
- a current sensor 41.

FIG. 1 also shows the following electrical parameters:

- the electrical resistance R10 of the detector 10.*p*,
- the electrical resistance R11 of the compensator 11.*p*,
- the voltage U42 at the power supply unit 42,
- the strength 13 of the current flowing through the electrical line 3,
- the electrical voltage U10 applied to the detector 10.*p*, and
- the electrical voltage U11 applied to the compensator 11.*p*.

Note: The term "electrical resistance" refers to both a component and an electrical property of a component.

In the embodiment shown in FIG. 1, the two detection units of the detection arrangement form a Wheatstone measuring bridge. The detector 10.*p* and the compensator 11.*p* are connected in series. The electrical resistance of the voltage sensor 40 is high compared to the electrical resistances of the components 10.*p*, 11.*p*, R20 and R21. In one embodiment, the voltage sensor 40 directly measures the so-called bridge voltage ΔU=(U10−U11)/2. The current sensor 41 measures the current intensity I3.

Ideally, the bridge voltage ΔU is zero if there is no flammable target gas inside the housing 1. However, due to design-related differences in particular, the bridge voltage ΔU is usually not equal to zero, even if there is no combustible target gas. Therefore, a so-called zero point ΔU,0 is determined in advance, preferably empirically. The zero point ΔU,0 is the bridge voltage ΔU in the absence of combustible target gas.

A measured detection variable correlates with the concentration of combustible target gas. A signal-processing evaluation unit not shown in FIG. 1 applies a predefined functional relationship to the detection variable AU-ΔU,0 and derives an estimated value (an indicator value) for the target gas concentration.

In one form of implementation, the current I3 is kept constant by closed-loop control. The voltage ΔU then correlates with the electrical resistance and therefore with the temperature change caused by the target gas oxidation. The difference ΔU-ΔU,0 acts as the detection variable.

Figure 2:
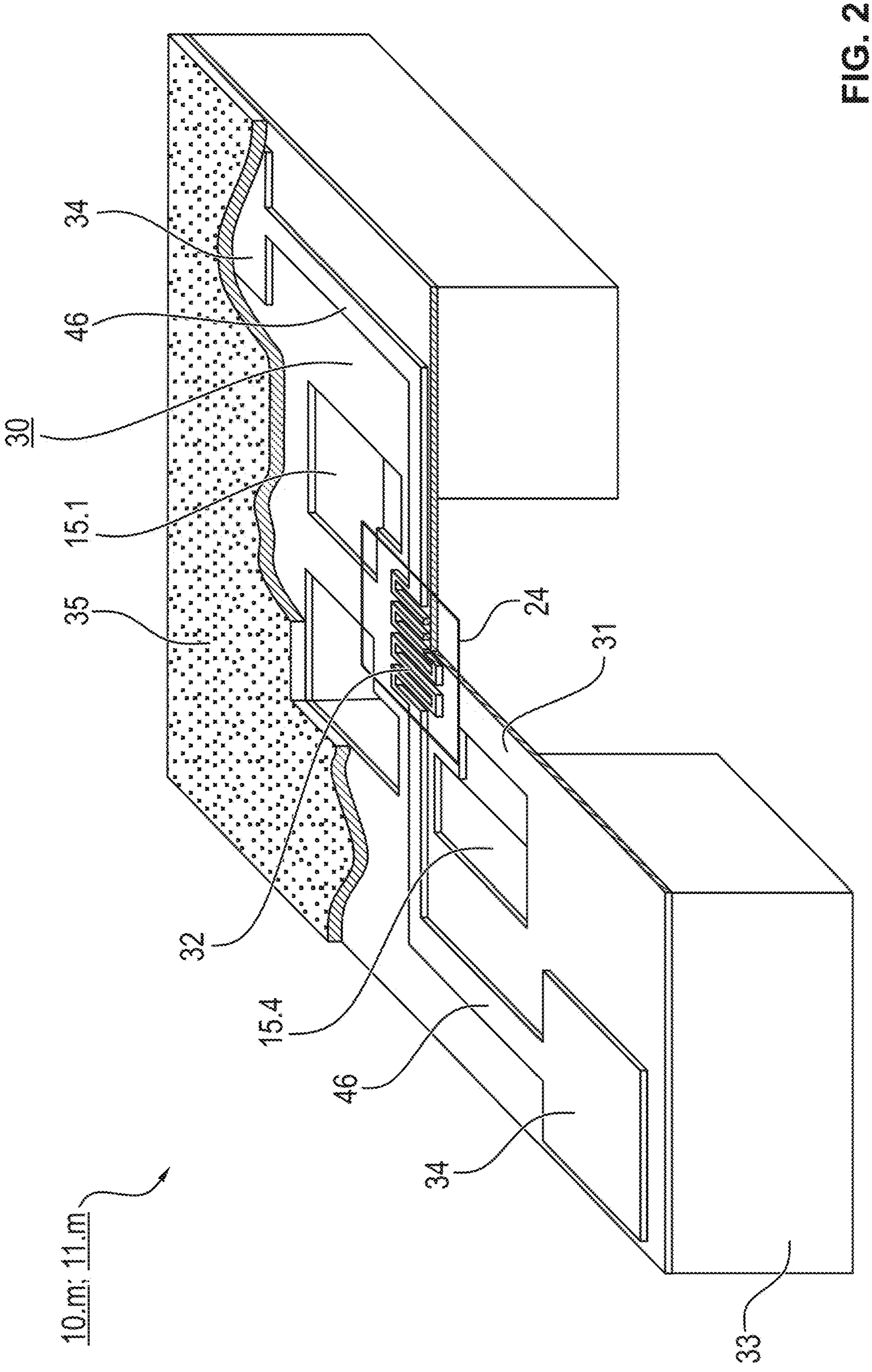
FIG. 2 is a perspective view of a flat detection unit.
Figure 3:
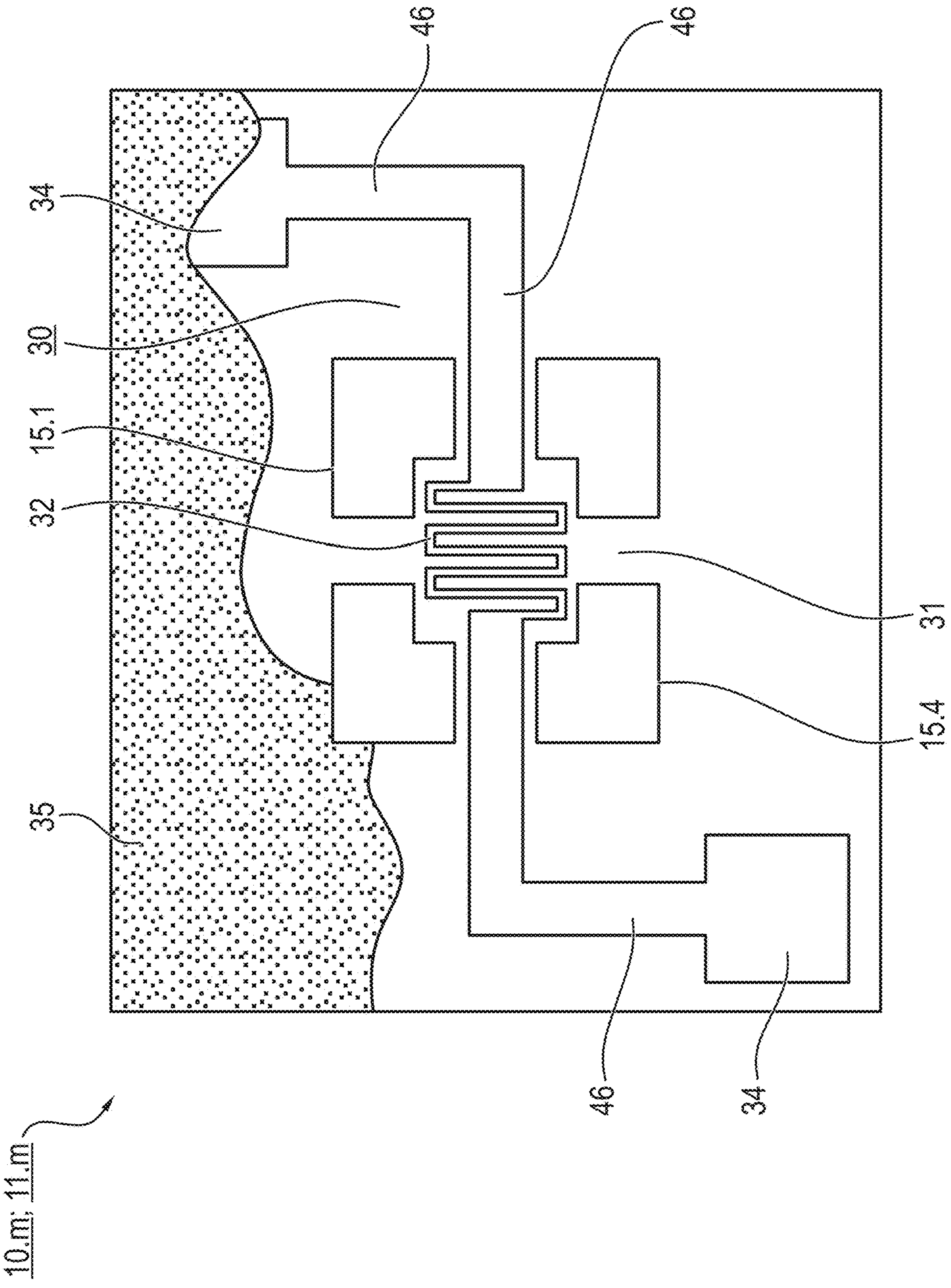
FIG. 3 is a top view of the detection unit in FIG. 2.

FIG. 2 shows a perspective view of another implementation of the detector and the compensator. The detector according to this implementation is designated as 10.*m*, the compensator as 11.*m*. FIG. 3 shows a top view of the detector 10.*m* and the compensator 11.*m* of FIG. 2. The detector 10.*m* uses the same principle as the detector 10.*p* in FIG. 1, but is considerably flatter than the latter. The same applies to the compensator 11.*m*.

The detector 10.*m* and the compensator 11.*m* each comprise the following components:

- an electrically conductive component 30 with a heating segment 32 and an electrical contact 46, wherein the component 30 has the form of a conductor track (conductor path),
- a protective layer 35,
- a carrier plate 31 extending in a plane, this plane being oblique to the drawing plane of FIG. 2 and lying in the drawing plane of FIG. 3,
- a wafer substrate 33, which carries the carrier plate 31, and
- electrical contact points 34 for the electrically conductive component 30.

The protective layer 35 covers at least the conductor track 30, preferably the entire carrier plate 31, and prevents the conductor track 30 from coming into direct contact with a gas sample. In one embodiment, the protective layer 35 is made of silicon nitride. In the detector 10.*m*, catalytically active material is applied to the protective layer 35, at least in an area 24 above the heating segment 32.

The compensator 11.*m* comprises the same components as the detector 10.*m*. Preferably, the compensator 11.*m* differs from the detector 10.*m* in that the protective layer 35 of the compensator 11.*m* has less or even no catalytic material embedded in it, so that the compensator 11.*m* is not able to oxidize any combustible target gas or is able to do so to a lesser extent than the detector 10.*m*.

The conductor track 30 can be made of the same electrically conductive material as the component 20 of the detector 10.*p* of FIG. 1. The heating segment 32 of the conductor track 30 is preferably implemented by the conductor track 30 being zigzag-shaped or otherwise bent or corrugated in the area 24. Alternatively, the conductor track 30 has a cross-section that varies over the length of the conductor track 30 so that a sufficiently high operating temperature is achieved when current flows through the conductor track 30. Preferably, the maximum dimension of the conductor track 30 and thus the maximum dimension of the heating segment 32 in the plane of the carrier plate 31 is less than 2 mm, particularly preferably less than 1 mm, particularly preferably between 0.1 mm and 0.5 mm. The heating segment 32 or also the entire conductor track 30 is made of a metal, for example of platinum or tungsten or titanium, or of an alloy comprising at least one of the aforementioned metals.

The carrier plate 31 preferably has a thickness of less than 10 μm, particularly preferably less than 2 μm, in particular a thickness of at most 1 μm, and is preferably made of a material which contains silicon, for example a glass-like material. In the embodiment example, the carrier plate 31 is attached to the wafer substrate 33 by means of four webs. During manufacture, a gripper of a manipulator is able to grip and mount the compensator 11.m on the wafer substrate 33.

The electrically conductive conductor track 30 is applied to a surface of the carrier plate 31 and preferably embedded in the surface of the carrier plate 31. Preferably, the conductor track 30 has a maximum thickness, i.e. a maximum dimension perpendicular to the plane of the carrier plate 31, of no more than 1 μm, particularly preferably of no more than 0.5 μm. The carrier plate 31 thermally and preferably also electrically decouples the conductor track 30 from the environment. The carrier plate 31 is in contact with the surrounding air on at least one side, which ensures good thermal insulation of the conductor track 30. The carrier plate 31 can contain recesses 15.1, . . . . The recesses 15.1, . . . can lead to a strip-shaped carrier plate 31. The carrier plate 31 can also be formed over the entire surface.

In one embodiment, the wafer substrate 33 is less than 1 mm thick, particularly preferably less than 0.4 mm thick, and has a maximum diameter of multiple millimeters. The carrier plate 31 is applied to the wafer substrate 33, for example by chemical vapor deposition or by evaporation deposition. Preferably, a recess is made in the area of the wafer substrate 33 that is located below the heating segment 32, so that the heating segment 32 is surrounded by air on two sides. This improves the thermal insulation. The recess is produced, for example, by etching the recess into the material.

The electrical contact 46 connects the heating segment 32 to the electrical contact points 34 on the carrier plate 31. The protective layer 35 electrically insulates the conductive track 30 and thus the heating segment 32 from the environment and reduces the risk of damage. In particular, the protective layer 35 prevents the conductor track 30 from coming into contact with a gas from the environment, in particular with a gas that is potentially damaging to the conductor track 30, for example hydrogen.

Figure 4:
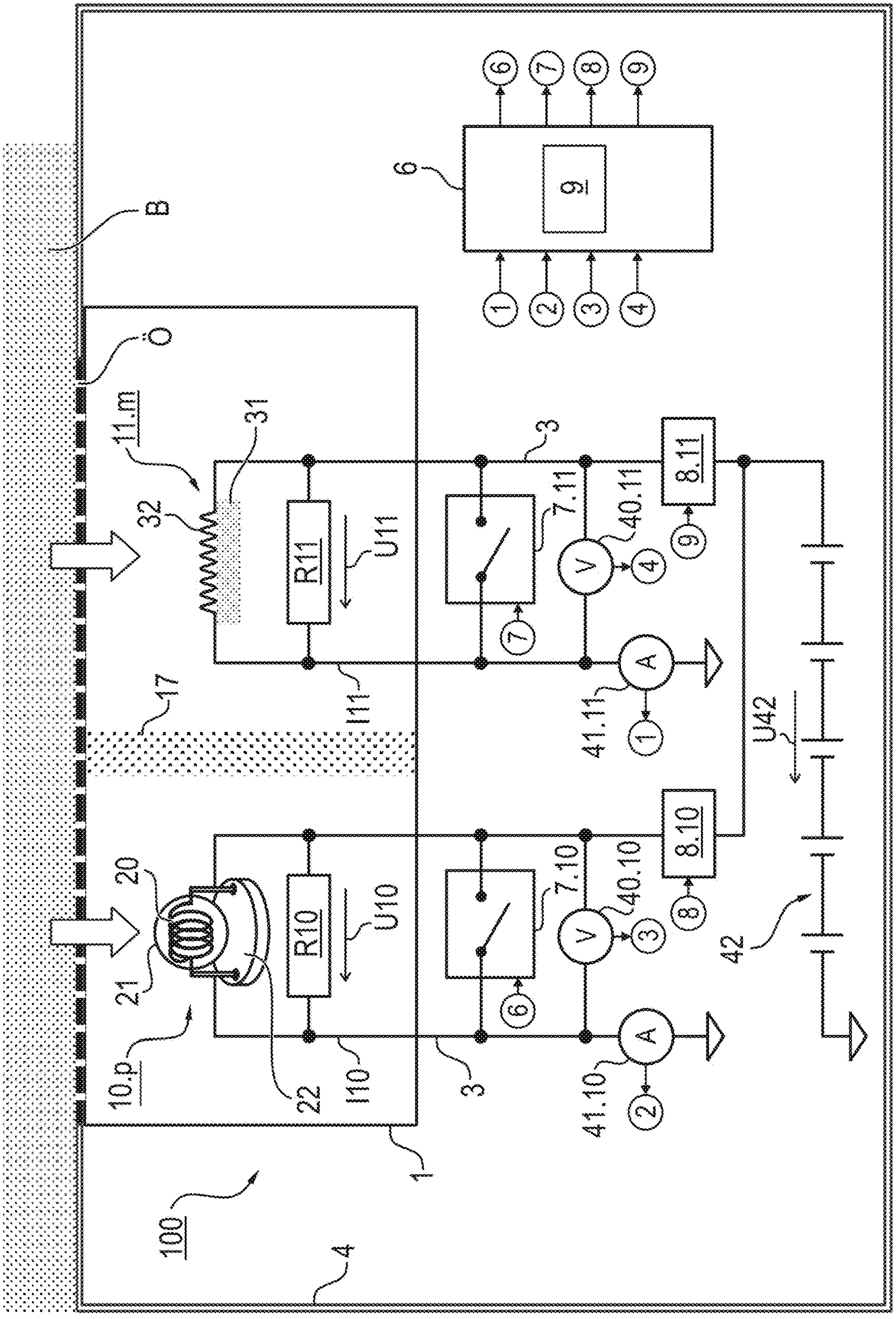
FIG. 4 is a partially schematic circuit diagram showing a gas detection device with a detector, which is configured as a pellistor, and a flat compensator, whereby both the detector voltage and the compensator voltage are measured.

FIG. 4 schematically shows an embodiment in which the detector is configured like the detector 10.*p* in FIG. 1, while the compensator is configured like the compensator 11.*m* in FIG. 2 and FIG. 3.

The gas detection device 100 of FIG. 4 comprises the following components:

- the detector 10.*p* with the heating segment 20, the ceramic coating 21 and the coating 23 made of a catalytic material,
- the compensator 11.*m* with a heating segment 32 and a carrier plate 31 and optionally also with catalytic material,
- the voltage source 42,
- two switches 7.10 and 7.11,
- a controllable voltage actuator 8.10, which is able to change the electrical voltage U10 applied to the detector 10.*p,*
- a controllable voltage actuator 8.11, which is able to change the electrical voltage U11 applied to the compensator 11.*m,*
- two voltage sensors 40.10 and 40.11,
- two current (amperage) sensors 41.10 and 41.11,
- the electrical resistors R20 and R21, see FIG. 1,
- a schematically shown signal-processing control unit 9 with an evaluation unit 6,
- an optional thermal barrier 17 between the detector 10.*p* and the compensator 11.*m,*
- the outer housing 4 with the opening Ö and
- the sturdy (rigid) inner housing 1.

The configuration shown in FIG. 4 can also be implemented with a detector 10 that is configured like the detector 10.*m* in FIG. 2 and FIG. 3. It is also possible that the compensator 11 is configured in the same way as the compensator 11.*p* in FIG. 1.

The spatial area B to be monitored and arrows illustrating how a gas sample flows from the sparial area B through the opening Ö into the interior of the housing 1 are also indicated. The flame arrester 2 is not shown.

The voltage sensor 40.10 measures the electrical voltage U10 applied to the detector 10.*p*, while the voltage sensor 40.11 measures the voltage U11 applied to the compensator 11.*m*. In contrast to the configuration shown in FIG. 1, currents of two different amperages can flow through the detector 10.*p* and the compensator 11.*m*. The two current sensors 41.10 and 41.11 measure these two currents I10 and I11 respectively.

Preferably, the two currents I10 and I11 are kept constant by means of closed-loop control. The temperature of the heating segment 20 of the detector 10.*p* correlates with the electrical resistance, and at constant current I10 the electrical resistance correlates with the voltage U10. Accordingly, the temperature and the electrical resistance of the heating segment 32 of the compensator 11.*m* correlate with the voltage U11. Preferably, two zero values for the voltages are determined in advance, namely a zero value U10,0 for the voltage U10 at the detector 10.*p* and a zero value U11,0 for the voltage U11 at the compensator 11.*m* in the absence of combustible target gas. Preferably, the difference (U10-U10, 0)-(U11-U11,0) is used as the detection variable.

In order to save electrical energy, the control unit 9 in the embodiment example causes a pulsed voltage to be applied to the detector 10.*p* and the compensator 11.*m* instead of a continuous electrical voltage. The control unit 9 controls the two switches 7.10 and 7.11 with the aim of pulsing the electrical voltage U10 and U11 applied to the detector 10.*p* and the compensator 11.*m* respectively. Preferably, the pulse rate and/or the pulse duration of the electrical voltage U10 applied to the detector 10.*p* can be set and changed independently of the pulse rate and the pulse duration of the electrical voltage U11 applied to the compensator 11.*m*.

Figure 5:
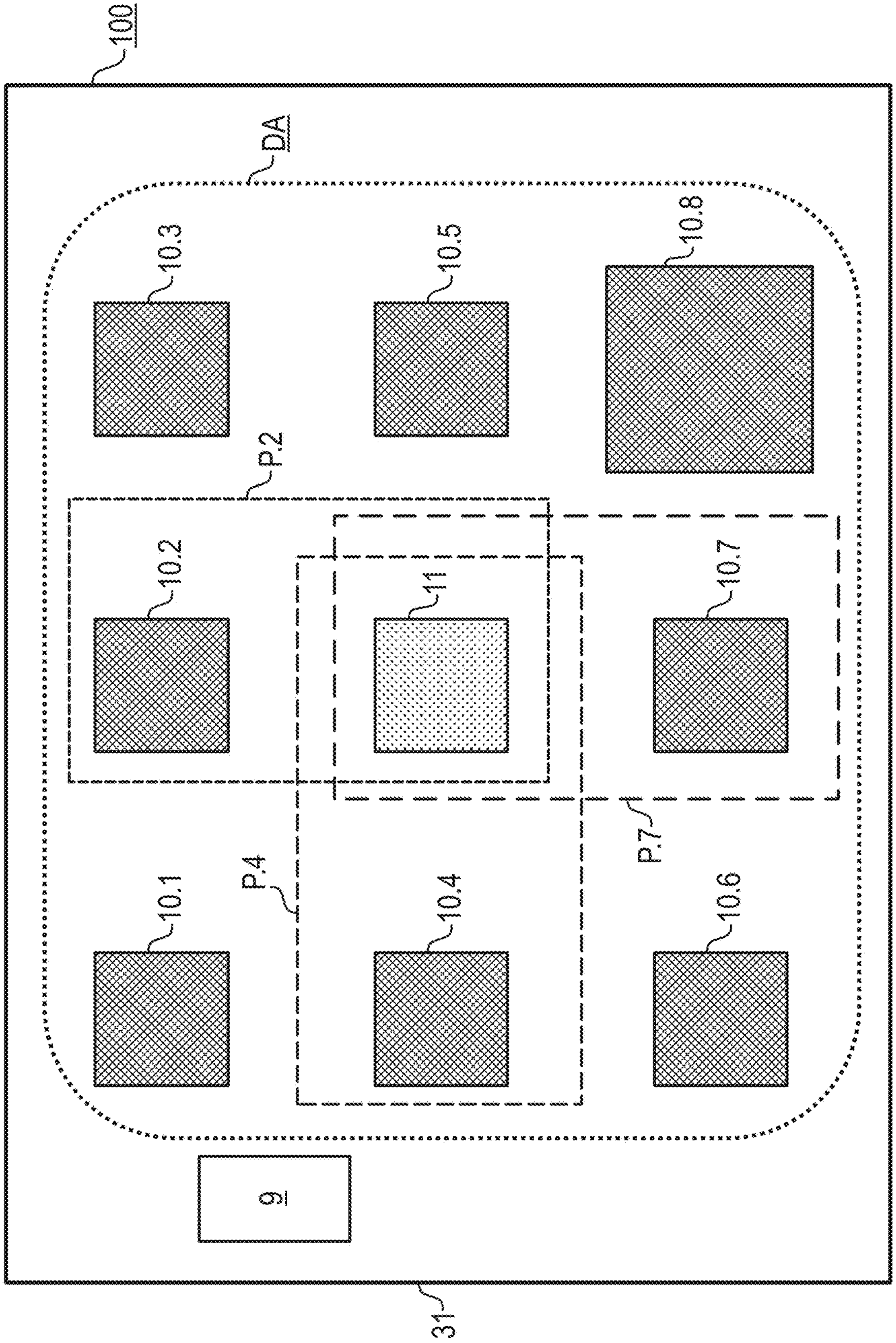
FIG. 5 is a top view of a gas detection device according to the invention with nine detection units including eight detectors and one compensator, i.e. eight detector-compensator pairs on a circuit board.

FIG. 5 shows a schematic top view of a gas detection device 100 according to the invention. Nine schematically shown detection units, namely eight detectors 10.1, . . . , 10.8 and a compensator 11, as well as the control unit 9, are mounted on a carrier plate 31, which is configured as a circuit board and extends in the drawing plane of FIG. 5. Preferably, each detector 10.1, . . . , 10.8 and the compensator 11 are constructed as described with reference to FIG. 2 and FIG. 3, i.e. they are flat components. It is also possible that at least one detector 10.1, . . . , 10.8 or the compensator 11 is constructed as described with reference to FIG. 1. The carrier plate 31 provides the electrical contacts for the nine detection units 10.1, . . . , 10.8, 11, whereby these electrical contacts are not shown in FIG. 5. The nine detection units 10.1, . . . , 10.8, 11 and the circuit board 31 are part of the detection arrangement DA.

Seen in the viewing direction of FIG. 5, the nine detection units 10.1, . . . , 10.8, 11 are arranged next to each other on the carrier plate 31 without overlapping, and a respective distance between two adjacent detection units occurs. A gas sample can therefore reach all nine detection units simultaneously without one detection unit shadowing another detection unit, i.e. without restricting the process of the gas sample reaching the other detection unit. In the implementation shown, the nine detection units 10.1, . . . , 10.8, 11 form a 3×3 matrix, i.e. an arrangement with three rows and three columns, each with three detection units, with the only compensator 11 arranged in the middle (centrally). Because the compensator 11 is arranged in the middle, there is only a relatively small distance between the compensator 11 and each detector 10.1, . . . , 10.8, so that the ambient conditions around the compensator 11 and around the detector 10.1, . . . , 10.8 are approximately the same.

Of course, a different number of rows and/or columns of a board with detection units as well as a different number of detection units per row and/or per column is also possible. The compensator 11 is preferably, but not necessarily, arranged in the center. The gas detection device 100 can also comprise multiple such boards with detection units, whereby these boards are preferably arranged parallel to each other and a gas sample can reach each board.

It is possible that all nine detection units 10.1, . . . , 10.8, 11 have the same effective surface, whereby the effective surface comes into contact with a gas sample that is arranged inside the housing 1. In the example shown, however, eight detection units 10.1, . . . , 10.7, 11 each have the same effective surface area. The detector 10.8 has a larger effective surface area, preferably an effective surface area at least one and a half as large, particularly preferably an effective surface area twice as large, as the detectors 10.1 to 10.7 and twice as large as the compensator 11.

In the implementation shown, eight detector-compensator pairs P.1, . . . , P.8 are implemented on the carrier plate 31, the detector-compensator pair P.x comprising the detector 10.*x* (x=1, . . . , 8) and the compensator 11. The single compensator 11 thus belongs to each of the eight detector-compensator pairs P.1, . . . , P.8. In general, a gas detection device 100 according to the invention comprises m detectors and n compensators, where m>n>=1, and m>1. Preferably, m>=2*n, particularly preferably m>=5*n. With m detectors and n compensators, a total of up to m*n pairs are formed, each with one detector and one compensator. One advantage of the preferred embodiment of having more detectors than compensators is the following: Deposits often form on the heated surface of a detector. The detector becomes poisoned in the course of use. As a rule, significantly fewer deposits form on the heated surface of the compensator. If there are more detectors than compensators, in many cases the gas detection device can be operated for longer, even if individual detectors have failed.

The control unit 6, which is shown schematically in FIG. 5, is able to switch each detector-compensator pair P.x on and off independently of any other detector-compensator pair P.y (y #x). The control unit 9 causes at most one pair P.x to be switched on at any time and to be supplied with continuous or pulsed electrical voltage, while all other pairs P.y are switched off. If the detector-compensator pair P.x is switched on, an electrical voltage is applied to both the detector 10.*x* and the compensator 11, preferably a pulsed voltage is applied, and a current flows both through the heating segment of the detector 10.*x* and through the heating segment of the compensator 11. The detector 10.*x* and the compensator 11 can be connected in particular as a Wheatstone measuring bridge, as shown in FIG. 1, or in parallel to each other, as shown in FIG. 4. Preferably, when pair P.x is switched on, the electrical voltage at detector 10.*x* and compensator 11 is pulsed in order to save energy.

According to the invention, the gas detection device 100 is operated in such a way that, during an operation, exactly one pair P.x is switched on most of the time and the other pairs are switched off. "Most of the time" means that between the activation period of one pair P.x and a subsequent activation period of another pair P.y, an intermediate period elapses in which all pairs are switched off, the intermediate period preferably being shorter than the or each activation period. During a rest period (idle period), all pairs are generally switched off. The switched-on pair P.x supplies a value for the detection variable, for example a value for the bridge voltage (using a Wheatstone bridge configuration) or a value for the detector voltage and a value for the compensator voltage (embodiment according to FIG. 4). The value for the detection variable is an indicator of the current target gas concentration. Of course, it is possible that different pairs successively provide different values for the target gas concentration, although the target gas concentration remains the same. In addition to design or manufacturing-related differences, this can be caused in particular by different poisoning or other ageing of a pair. This is explained in more detail below.

When a detector-compensator pair P.x is switched on, an electrical voltage is applied to both the detector 10.*x* and the compensator 11. In a first implementation, the electrical voltage is applied continuously to both the detector 10.*x* and the compensator 11 during the period in which the pair P.x is switched on, preferably in pulsed form.

In a preferred implementation, during the period in which the pair P.x is switched on, the electrical voltage is only present continuously at the detector 10.*x*, preferably pulsed, while an electrical voltage is only present intermittently (temporarily) at the compensator 11. The preferred implementation can be implemented using the circuit in FIG. 4, for example. Because the compensator 11 is able to oxidize less or even no target gas at all, its temperature is essentially influenced by the applied voltage and the ambient temperature, and the ambient temperature generally changes much more slowly than the concentration of the target gas. Therefore, in many cases it is sufficient to measure the electrical voltage or other detection variable applied to the compensator 11 once during an activation period and to use the measured detection variable value of the compensator 11 for the entire activation period in which the pair P.x is switched on. The preferred form of implementation saves electrical energy and extends the service life of the compensator 11.

As already explained, poisoning pollutants are often deposited on a heated detector 10 during use. These deposits can limit or even completely prevent the ability of the detector 10 to oxidize combustible target gas. The detector 10 then becomes increasingly poisoned. A detector-compensator pair P.x with a poisoned detector 10.*x* is often no longer able to reliably detect a combustible target gas. In the following, embodiments are described as to how the gas detection device 100 according to the invention is able to automatically detect poisoning of a detector 10. Preferably, a detector-compensator pair P.x with a detector 10.*x* is no longer switched on if a significant poisoning of the detector 10.*x* has been automatically detected. Because multiple detector-compensator pairs P.x are present according to the invention, the gas detection device 100 can nevertheless continue to be used. The invention thus extends the service life of the gas detection device 100.

In a preferred embodiment, one detector is held in reserve. In the embodiment example shown in FIG. 5, this is the detector 10.8, which has a larger effective surface area than the other detectors 10.1, . . . , 10.7. To "hold in reserve" means that the detector-compensator pair P.8 with the detector 10.8 is not switched on as long as no suspicion of poisoning of another detector 10.1, . . . , 10.7 is detected.

It is possible that at least one detector-compensator pair P.1, . . . , P.8 is poisoned, in particular because contaminants have deposited on the heated surface of the detector 10.1, . . . , 10.8, or due to other ageing. In this case, the pair with this detector is unable to detect the target gas, and the measured values of this pair result in a value for the target gas concentration that is too low. As a rule, however, the measured values of a poisoned or otherwise aged pair do not lead to a value for the target gas concentration that is significantly too high.

The gas detection device 100 of the embodiment example detects a suspected poisoning preferably as follows, namely during operation or in a special check phase: The control unit 6 switches the pairs P.x on and off again one after the other. Each pair P.x provides a respective value for the detection variable. The evaluation unit 9 derives for each pair P.x that is switched on a value (estimated value or indicator) con.x for the current target gas concentration. For this purpose, the evaluation unit 6 applies a predefined functional relationship to the measured value of the detection variable. The evaluation unit 9 thus provides a time sequence con.x (1), con.x (2), . . . of estimated values for the current target gas concentration. Each value con.x (1), con.x (2), . . . refers to a respective sampling time t(1), t(2), . . . with t(1)<t(2)< . . . and x=1, . . . . Each pair P.x provides at least one value con.x (i) for the current target gas concentration.

The evaluation unit 6 checks whether the target gas concentration rises or falls sharply between two successive sampling times t(1), t(2), . . . . The first alternative is described first, i.e. the detection of a strong increase.

For the following description, con.a(j) denotes a value for the target gas concentration which was derived on the basis of at least one detection variable value of the pair P.a (a=1, . . . , 7) and relates to the sampling time t(j) (j=1, 2, . . . ). With con.b(j) a value of the pair P.b (b=1, . . . , 7) is designated, with con.8 (j) a value of the pair P.8. As already mentioned and shown in FIG. 5, the detector 10.8 of the pair P.8 has a larger effective surface area than the other seven detectors 10.1, . . . , 10.7. In addition, the pair P.8 is kept in reserve, i.e. only switched on for checking, and is therefore less exposed to harmful gases than the other seven detectors 10.1, . . . , 10.7. It is therefore assumed that the pair P.8 is intact and provides correct values until the gas detection device 100 is regularly (routinely) checked.

The evaluation unit 6 checks whether a difference con.b (i)-con.a(i−1) of the target gas concentration values at the two successive sampling times t(i−1) and t(i) is greater than a predetermined absolute or relative threshold, wherein the two values con.a(i−1) and con.b(i) were determined on the basis of measurements of two different pairs P.a and P.b and wherein this threshold may depend on the distance (time gap) between t(i−1) and t(i). The pair P.a provides the value con.a(i−1), the pair P.b provides the value con.b(i).

A measured strong increase in the target gas concentration between the two sampling times t(i−1) and t(i) can have the following reasons:

- The target gas concentration has actually risen sharply between the two sampling times t(i−1) and t(i), for example because a relevant quantity of target gas has escaped in the time span between the two sampling times t(i−1) and t(i).
- In reality, a high target gas concentration was already present at the earlier sampling time. However, the P.a pair is so heavily poisoned that this high target gas concentration can no longer be detected only on the basis of a measurement of the P.a pair.

These two situations are now automatically distinguished from each other. To check the gas detection device 100, the control unit 9 switches on the pair P.8.

The evaluation unit 6 derives a value con.8 (i+1) for the target gas concentration from measured values of the pair P.8. The value con.8 (i+1) refers to a subsequent sampling time t(i+1) and is considered correct. The evaluation unit 6 compares this value con.8 (i+1) with the two values con.a (i−1) and con.b(i). Depending on the result of the evaluation unit 6, the control unit 9 triggers the following steps:

- If the larger value con.b(i) corresponds sufficiently closely to the value con.8 (i+1), then at least at the sampling times t(i) and t(i+1) there was actually a higher target gas concentration con.b(i) or con.8 (i+1) than at the sampling time t(i−1), and the pair P.b still works.
- It is necessary to check whether the low value con.a(i−1) at the earlier sampling time t(i−1) is correct or not. The control unit 9 switches on the pair P.a, and based on the measurement of the pair P.a, the evaluation unit 6 provides a value con.a(i+2), which refers to the sampling time t(i+2). If the pair P.a also delivers a large value con.a(i+2), then the target gas concentration has actually increased significantly between the two sampling times t(i−1) and t(i), and the pair P.a is also working.

Figure 6:
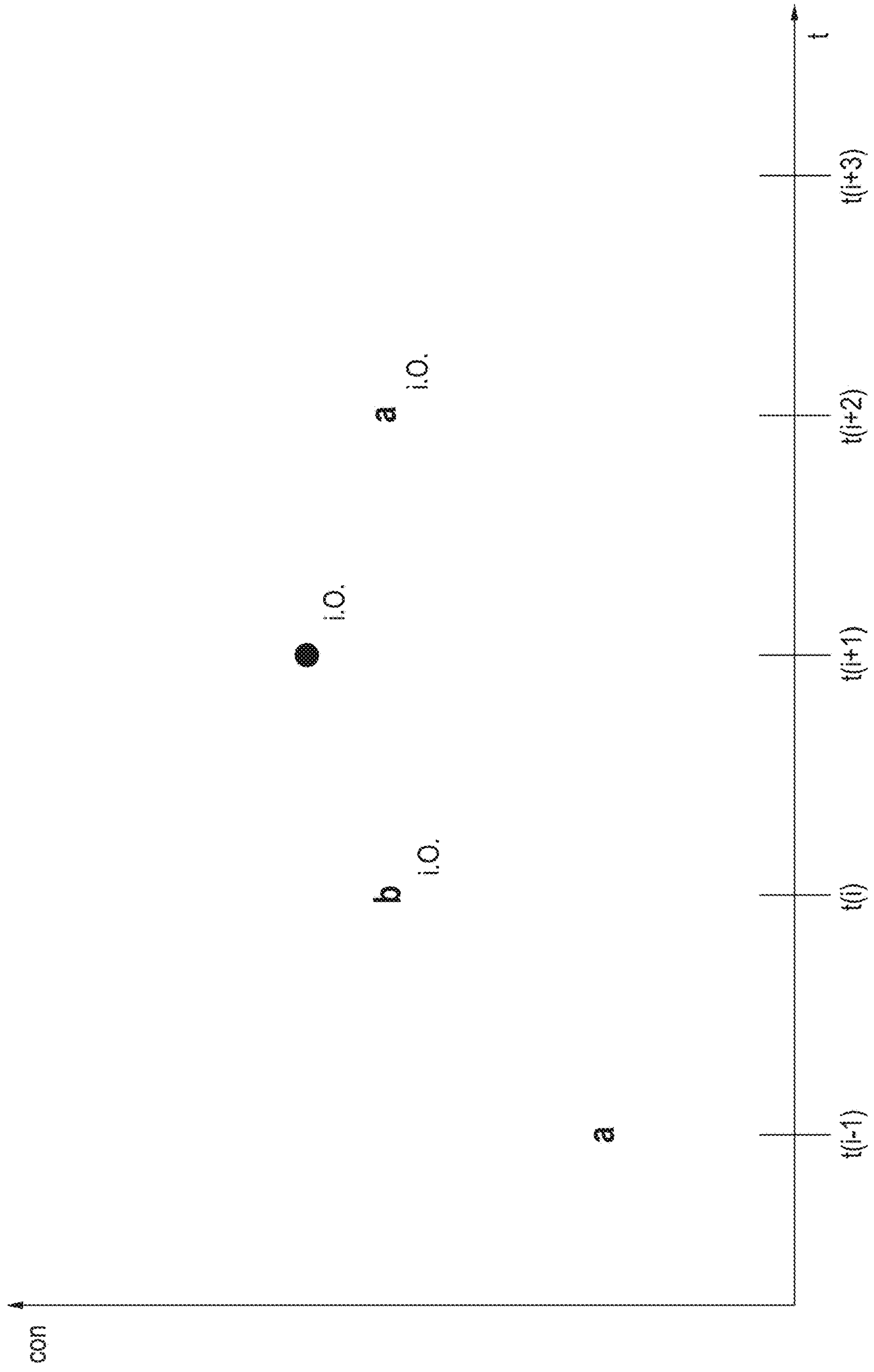
FIG. 6 is a graph showing an exemplary time course of a self-test of the gas detection device after the detection of a steep increase in the target gas concentration, with all pairs intact.

FIG. 6 illustrates this sequence. The time t is plotted on the x-axis and the measured target gas concentration con on the y-axis. Measured values based on a measurement of the pair P.a are labeled with an a, measured values based on a measurement of the pair P.b are labeled with a b and measured values based on a measurement of the pair P.8 are labeled with a full circle.

Figure 7:
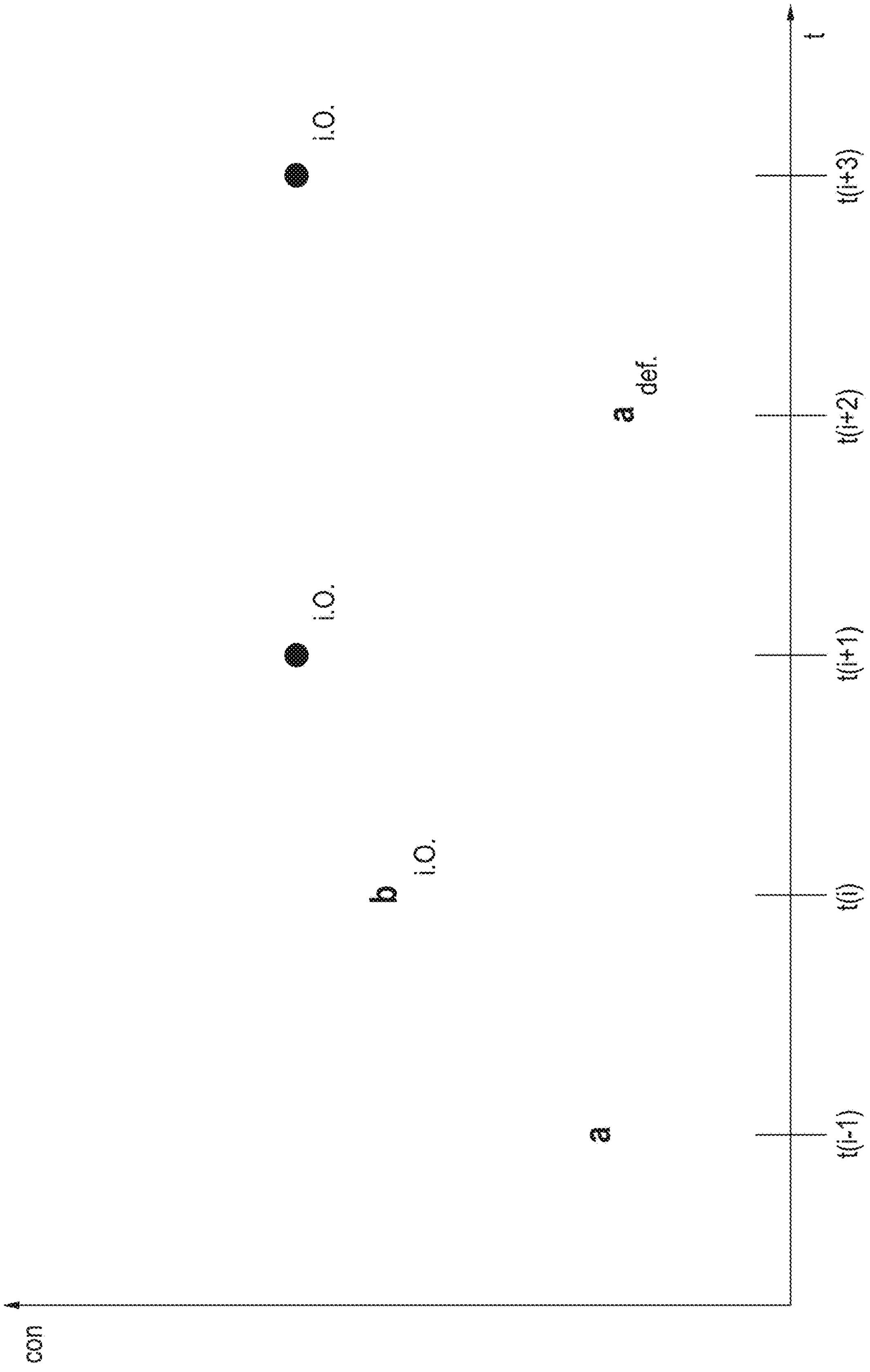
FIG. 7 is a graph showing a variation of the time course of FIG. 6, whereby one pair is defective.

However, if the pair P.a delivers a small value con.a(i+2), the control unit switches the pair P.8 on again. This provides a value con.8 (i+3) for a sampling time t(i+3). If the pair P.8 delivers a large value con.8 (i+3) again, the value con.a(i+2)

is incorrect and the pair P.a is defective and is no longer used. FIG. 7 shows this situation.

If, on the other hand, the pair P.8 also delivers a small value con.8 (i+3), the target gas concentration has fallen sharply again after the sampling time t(i+2). One possible reason for this is that the gas detection device 100 has been moved from an area with a high target gas concentration to an area with a low target gas concentration or without target gas. The pair P.a will then also continue to be used.

The second alternative is now described, i.e. the detection of a strong drop (decrease). To be more precise: The value con.b(i) for the sampling time t(i) is significantly lower than the value con.a(i−1) for the sampling time t(i−1). The evaluation unit 6 has derived the value con.b(i) on the basis of measured values of the pair P.b, and the value con.a(i−1) on the basis of measured values of the pair P.a.

Again, a value con.8 (i+1) is used for checking, which refers to the sampling time t(i+1).

First of all, the situation is described in which the value con.8 (i+1), which is considered to be correct, is approximately as large as or even larger than the larger value con.a(i−1). In this case, the control unit 9 switches the pair P.b on again. The measured value when switching on again leads to a value con.b(i+2), which refers to the sampling time t(i+2).

Figure 8:
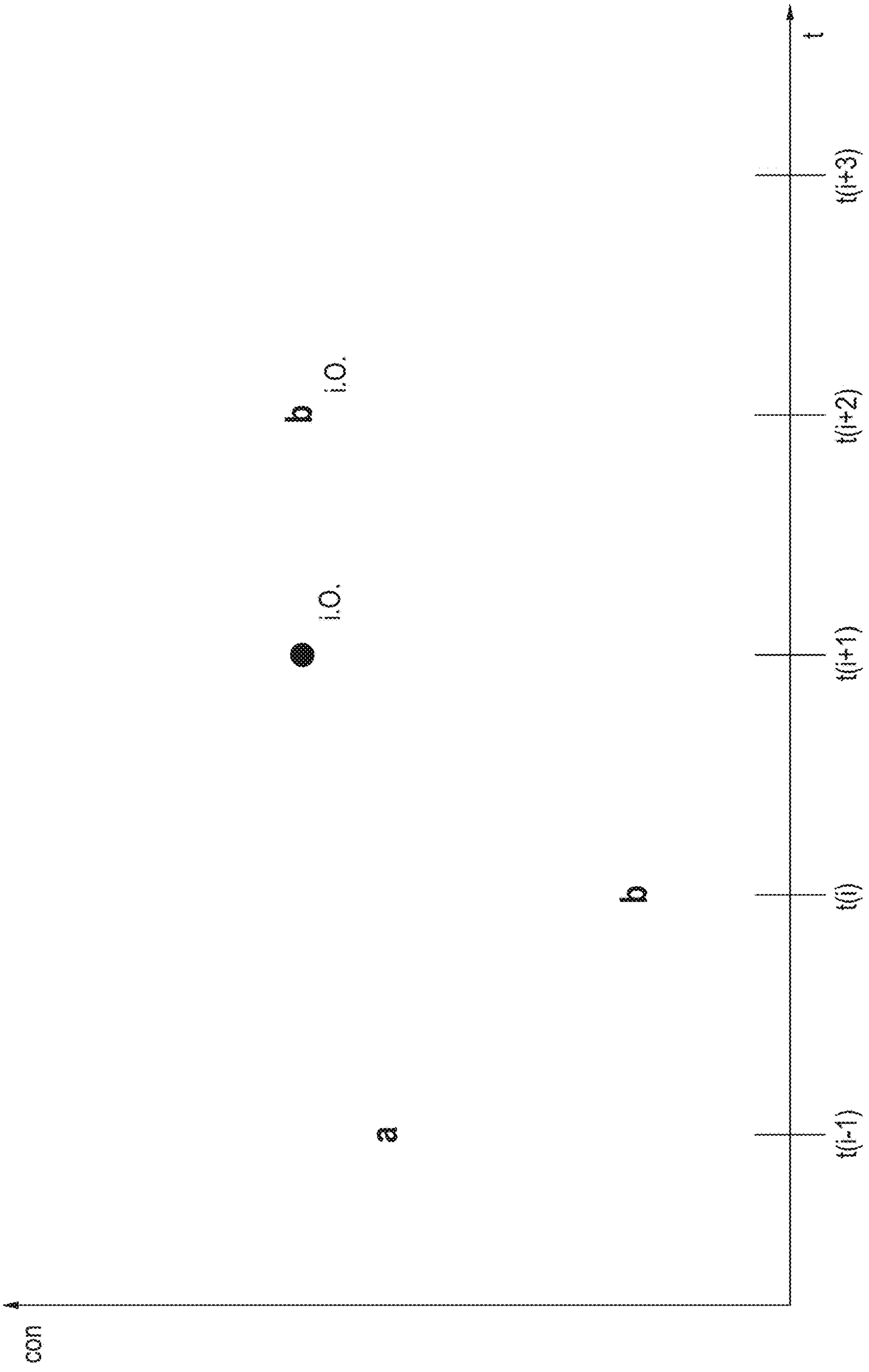
FIG. 8 is a graph showing an exemplary time course of a self-test of the gas detection device after the detection of a steep drop in the target gas concentration, with all pairs intact.

If the value con.b(i+2) for the sampling time t(i+2) is approximately as large as the value con.8 (i+1), which is regarded as correct, the pair P.b is regarded as intact and continues to be used. This situation is illustrated in FIG. 8.

Figure 9:
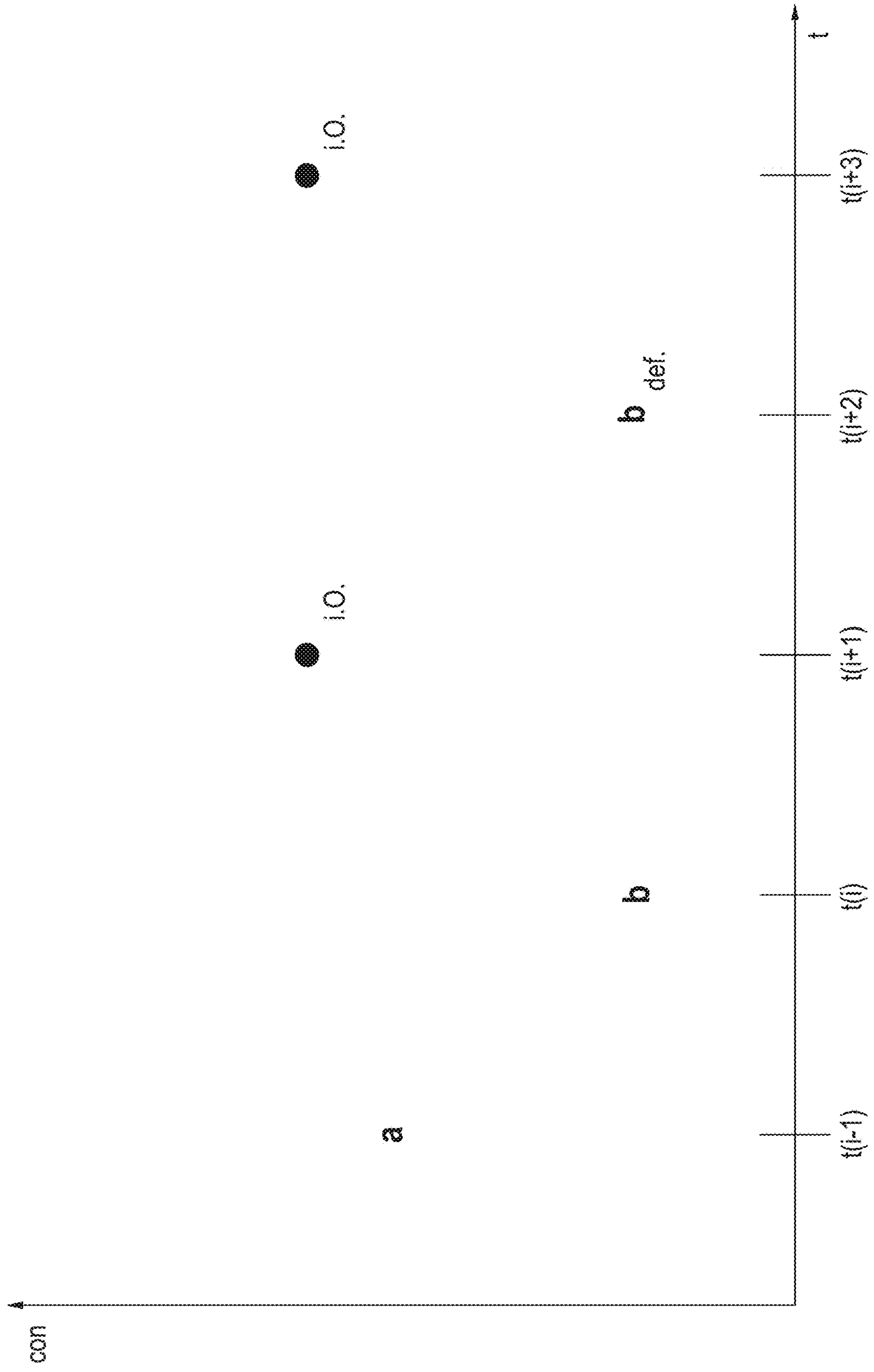
FIG. 9 is a graph showing a variation of the time course of FIG. 8, whereby one pair is defective.

If, on the other hand, the value con.b(i+2) for the sampling time t(i+2) is also significantly lower, for example about the same as the value con.b(i) for the sampling time t(i), the pair P.8 is preferably switched on again. This provides a value con.8 (i+3) for a sampling time t+3. If this value con.8 (i+3) is again large, the pair P.b is defective and is no longer used. This situation is shown in FIG. 9.

As already explained, pair P.8 is only switched on for checking purposes (verification) in the embodiment example. In one embodiment, all other pairs P.1, . . . , P.7 are switched on the same number of times and for the same length of time, for example in turn.

In another embodiment, the procedure is as follows:

Initially, only pair P.1 is used, whereby pair P.1 is switched on and off again N times, N>=2. The other pairs P.2, . . . , P.8 remain switched off. Pair P.2 is then switched on once and switched off again. The last two measurements con.1 (i−1) and con.2 (i) are compared with each other, for example as described above with reference to FIG. 6 to FIG. 9. P.1 acts as the pair P.a, P.2 as the pair P.b. If there is a large deviation, the pair P.8 is switched on at least once and then switched off again.

If the check shows that both pairs P.1 and P.2 are still intact, the sequence just described is repeated, i.e. first the pair P.1 is switched on and off again N times and then pair P.2 is switched (on and off) once. The other pairs remain switched off. Pair P.1 is therefore loaded N times more than pair P.2.

Because the pair P.1 is loaded N times more, the pair P.1 is usually poisoned more quickly than the other pairs P.2 to P.8. If it is detected that the pair P.1 is poisoned, it is not used any further. The sequence just described is now carried out with pairs P.2 and P.3. First, a sequence is carried out in which pair P.2 is switched on and off N times and then pair P.3 is switched (on and off) once. The last two values for the target gas concentration are compared with each other again. The pair P.2 acts as the pair P.a, the pair P.3 acts as the pair P.b.

This procedure is carried out until the pairs P.1 to P.6 are poisoned so that self-control is no longer possible. It is also possible to switch on one pair N times and the other pair M times, whereby N>M>1 applies. The above applies accordingly.

While specific embodiments of the invention have been shown and described in detail to illustrate the application of the principles of the invention, it will be understood that the invention may be embodied otherwise without departing from such principles.

List of reference symbols

| | |
|---|---|
| 1 | Stable and heat-resistant inner housing, accommodates the detector 10.p and the compensator 11.p, 11.m |
| 2 | Flame protection before opening Ö |
| 3 | Electrical cable, connects the power supply unit 42 with the detector 10.p and the compensator 11.p, 11.m |
| 4 | Outer housing made of a stable plastic, surrounds the other components of the gas detection device 100 |
| 6 | Signal-processing evaluation unit, derives the target gas concentration |
| 7.10 | Controllable switch, causes a pulsed electrical voltage U10 to be applied to the detector 10.p |
| 7.11 | Controllable switch, causes a pulsed electrical voltage U11 to be applied to compensator 11.m |
| 8.10 | Voltage actuator for the detector 10.p |
| 8.11 | Voltage actuator for the compensator 11.m |
| 9 | Signal-processing control unit |
| 10.1, 10.2, . . . | Detectors |
| 10.8 | Detector with a larger effective surface area |
| 10.m | Flat detector |
| 10.p | Detector configured as a spherical pellistor |
| 11 | Compensator |
| 11.m | Flat compensator |
| 11.p | Compensator, which is configured as a spherical pellistor |
| 15.1, . . . | Recesses in the carrier plate 31 and the protective layer 35 |
| 17 | Optional thermal barrier between the detector 10.p and the compensator 11.m |
| 20 | Heating segment of the detector 10.p |
| 21 | Ceramic coating around the heating segment 20 |
| 22 | Plate carrying the electrical contacts 36 |
| 23 | Catalytic coating of the ceramic coating 21 of the detector 10.p |

-continued

| List of reference symbols | |
|---|---|
| 24 | Catalytic coating of the detector 10.m on the protective layer 35 |
| 30 | Electrically conductive component in the form of a conductor track with the heating segment 32 and the electrical contact 46, present once in the detector 10.m and once in the compensator 11.m |
| 31 | Carrier plate in the form of a circuit board, provides the electrical contacts for the detectors 10.m, 10.1, . . . , 10.8 and the compensator 11.m, 11, covered by the protective layer 35, has the recesses 15.1, . . . |
| 32 | Heating segment of the component 30 |
| 33 | Wafer substrate |
| 34 | Electrical contact points for the electrically conductive component 30 |
| 35 | Protective layer for the conductor track 30, has the recesses 15.1, . . . |
| 36 | Electrical contacts of the heating segment 20 |
| 40 | Voltage sensor, measures the bridge voltage $\Delta U = (U10 - U11)/2$ |
| 40.10 | voltage sensor, measures the electrical voltage U10 applied to the detector 10.p |
| 40.11 | voltage sensor, measures the voltage U11 applied to the compensator 11.m |
| 41 | Current sensor, measures the current intensity (amperage) I3 |
| 41.10 | Current sensor, measures the current intensity (amperage) I10 |
| 41.11 | Current sensor, measures the current intensity (amperage) I11 |
| 42 | Power supply unit |
| 46 | Electrical contact of the component 30 |
| 100 | Gas detection device, comprises the detection arrangement DA, the control unit 9 with the evaluation unit 6, the power supply unit 42 and the two housings 1 and 4 with the opening 2 |
| B | spatial area to be monitored |
| con.a(j) | Value for the target gas concentration, which is derived on the basis of a measured value from pair P.a and relates to the sampling time t(j) (a = 1, . . . , 7; j = 1,2, . . . ) |
| con.b(j) | Value for the target gas concentration, which is derived on the basis of a measured value from pair P.b and relates to the sampling time t(j) (b = 1, . . . , 7; j = 1, 2, . . . ) |
| con.8(j) | Value for the target gas concentration, which is derived on the basis of a measured value from pair P.8 and relates to the sampling time t(j) (j = 1, 2, . . . ) |
| DA | Detection arrangement, comprises the eight detectors 10.1, . . . , 10.8, the compensator 11, the circuit board 31 and preferably the electrical contacts |
| I3 | Current intensity (amperage) of the current through the line 3, the detector 10.p and the compensator 11.p, is measured by the current intensity sensor 41 |
| I10 | Current intensity (amperage) of the current through the detector 10.p, is measured by the current sensor 41.10 |
| I11 | Current intensity (amperage) of the current through the compensator 11.m, is measured by the current sensor 41.11 |
| Ö | Opening in the outer housing 4 and in the inner housing 1, secured by the flame arrester 2 |
| P.1, P.2, . . . | Detector-compensator pair, each comprising a detector 10.1, . . . , 10.8 and the compensator 11 |
| R10 | Electrical resistance of the detector 10.p |
| R11 | Electrical resistance of the compensator 11.p |
| R20 | Electrical resistance, connected in parallel with detector 10.p |
| R21 | Electrical resistance, connected in parallel with compensator 11.p |
| t(1), t(2), . . . | Sampling times |
| U10 | Electrical voltage applied to the detector 10.p, preferably a pulsed voltage |
| U10.0 | Zero value for the voltage U10 |
| U11 | Electrical voltage applied to the compensator 11.p, 11.m, preferably a pulsed voltage |
| U11.0 | Zero value for the voltage U11 |
| U42 | Electrical voltage applied to the power supply unit 42 |
| ΔU | Bridge voltage, measured by voltage sensor 40, is equal to $(U10 - U11)/2$ |

What is claimed is:

1. A gas detection device which is configured to detect a presence of at least one combustible target gas in a gas sample and/or to determine a concentration of the target gas in the gas sample, the gas detection device comprising:
- a detection arrangement comprising three detection units, wherein the detection units comprise two detectors and a compensator and forms two different detector-compensator pairs comprising exactly one detector and exactly one compensator, wherein a number of detectors is greater than a number of compensators, wherein the compensator belongs to two different detector-compensator pairs;
- a measuring unit; and
- a signal-processing evaluation unit,
- wherein the gas detection device is configured to switch each detector-compensator pair on and off independently of any other detector-compensator pair,
- wherein the gas detection device is configured such that at any time at most one detector-compensator pair is switched on to provide a switched-on detector-compensator pair and each other detector-compensator pair is switched off,
- wherein the switched-on detector-compensator pair has a continuous or pulsed electrical voltage applied at least temporarily to the detector and a continuous or pulsed electrical voltage applied at least temporarily to the compensator of the detector-compensator pair, wherein the applied electrical voltages cause the detector and the compensator to heat up, wherein each detector is configured such that heating of the detector causes oxidation of target gas, the oxidation releasing thermal energy which acts on the detector, wherein the compensator is configured such that heating of the compensator causes less oxidation of target gas than heating of the detector or even causes no oxidation, wherein each detector-compensator pair has a detection variable that correlates with the thermal energy released by the detector-compensator pair during oxidation, wherein the measuring unit is configured to measure, for each detector-compensator pair, a value of the detection variable for the detector-compensator pair, wherein the evaluation unit is configured to determine whether the target gas is present or to determine the target gas concentration depending on the measured value of the detection variable for the switched-on detector-compensator pair, and wherein the gas detection device is configured to switch on each detector-compensator pair to effect the measurement of the respective detection variable and the determination whether the target gas is present or the target gas concentration determination and to switch off the detector-compensator pair.

2. The gas detection device according to claim 1, wherein during a period of use of the gas detection device a first detector-compensator pair is switched on for a longer period of time in total than a second detector-compensator pair.

3. The gas detection device according to claim 2, wherein the evaluation unit is configured to determine the target gas concentration and to compare a target gas concentration value provided by the first detector-compensator pair with a target gas concentration value provided by the second detector-compensator pair, and wherein the evaluation unit is configured, if the two values differ by more than a given threshold, to change a parameter value that the evaluation unit uses to determine on the presence of target gas and/or to determine the target gas concentration depending on the measured values of the first detector-compensator pair, or to deactivate the first detector-compensator pair.

4. The gas detection device according to claim 2, wherein the gas detection device is configured to switch on and switch off the first detector-compensator pair N1 times and to switch on and switch off the second detector-compensator pair N2 times during the period of use, where N1 and N2 are two numbers and N1 is greater than N2.

5. The gas detection device according to claim 2, wherein the gas detection device is configured to perform during the period of use a sequence at least once, wherein during the sequence the first detector-compensator pair is switched on and off N times and subsequently the second detector-compensator pair is switched on and off M times, where M and N are two numbers and $0<M<N$ applies.

6. The gas detection device according to claim 1, wherein at least one detector-compensator pair is configured such that both detection units of the detector-compensator pair have a respective detection variable, wherein the respective detection variable correlates with a temperature of the detection unit, and wherein the measuring unit is configured to measure which value the detection variable assumes for the detector and which value the detection variable assumes for the compensator when the detector-compensator pair is switched on.

7. The gas detection device according to claim 6, wherein the gas detection device is configured to operate the detector-compensator pair with the two detection variables such that first one detection unit and then the other detection unit of the detector-compensator pair is switched on and then switched off again, so that at any time during an activation period in which the detector-compensator pair is switched on, at most one detection unit of the detector-compensator pair is switched on.

8. The gas detection device according to claim 6, wherein the gas detection device is configured to operate the detector-compensator pair with the two detection variables such that the measuring unit is switched on in an activation period in which the detector-compensator pair is switched on and the measuring unit measures the value of the detection variable of the detector more frequently than the value of the detection variable of the compensator.

9. The gas detection device according to claim 1, wherein the detection arrangement extends in a plane and a maximum dimension perpendicular to the plane is at most 20% of the maximum dimension in the plane, and wherein the detection units are arranged in at least one row without overlapping when viewed in a direction perpendicular to the plane.

10. The gas detection device according to claim 9, wherein the compensator is arranged between the two detectors in a row in which multiple detection units are arranged.

11. The gas detection device according to claim 1, wherein the detection arrangement further comprises another detector to provide three detectors wherein the three detectors and the compensator extend in a common plane and the compensator is arranged between at least two of the three detectors.

12. The gas detection device according to claim 1, wherein the detection arrangement comprises a circuit board and each detection unit comprises a heating element, wherein each heating element heats up when an electrical voltage is applied to the detection unit, wherein the heating elements are arranged on and/or in the circuit board, wherein the circuit board provides a respective electrical contact for each heating element, and wherein each heating element of a detector is covered with a respective coating which comprises a catalytic material or to which a catalytic material is applied.

13. The gas detection device according to claim 1, wherein the detection arrangement further comprises a third detector-compensator pair, wherein the evaluation unit is configured to determine the target gas concentration and to compare a target gas concentration value provided by the first detector-compensator pair with a target gas concentration value provided by the second detector-compensator pair and to only switch on the third detector-compensator pair at least temporarily if the two values differ by more than a given threshold.

14. The gas detection device according to claim 13, wherein each detector has an effective surface that comes into contact with a gas sample and wherein the detector of the third detector-compensator pair has a larger effective surface area than the detector of the first detector-compensator pair and has a larger effective surface area than the detector of the second detector-compensator pair.

15. The gas detection device according to claim 1, wherein a zero value is specified for each detector-compensator pair, the zero value comprising a value that the detection variable assumes for the respective detector-compensator pair in the absence of target gas, wherein the evaluation unit is configured to calculate, for each detector-compensator pair, the difference between the value assumed by the detection variable and the zero value of the detection variable, and wherein the evaluation unit is configured, for each detector-compensator pair switched on, depending on the difference between the measured detection variable value and the zero value, to determine the presence of the target gas and/or to determine the target gas concentration.

16. The gas detection process for detecting a presence of at least one combustible target gas in a gas sample and/or for determining a concentration of the target gas in the gas sample, the process comprising the steps of:

providing a gas detection device, which gas detection device comprises a detection arrangement comprising three detection units and a measuring unit, wherein two different detection units are detectors and one detection unit is a compensator and two different detector-compensator pairs are formed, each with exactly one detector and exactly one compensator, where the number of detectors is greater than the number of compensators, wherein the compensator belongs to at least two different detector-compensator pairs;

switching on at least one detector-compensator pair, wherein in a switched-on state of the detector-compensator pair an electrical voltage is applied at least temporarily to the detector and an electrical voltage is applied at least temporarily to the compensator, wherein the applied electrical voltages cause the detector to heat up and cause the compensator to heat up, wherein heating of the detector causes oxidation of target gas, the oxidation releasing thermal energy which acts on the detector, wherein heating the compensator causes less oxidation than heating a detector or causes no oxidation at all, wherein each detector-compensator pair has a detection variable which correlates with the thermal energy released by the detector-compensator pair during oxidation;

switching the detector-compensator pair off, wherein at any time at most one detector-compensator pair is switched on and the or each other detector-compensator pair is switched off; and measuring, with the measuring unit, a value which the detection variable assumes for the respective switched-on detector-compensator pair; and determining for each respective switched-on detector-compensator pair depending on the measured value that the detection variable assumes for the respective detector-compensator pair, the presence of the target gas and/or the target gas concentration.

* * * * *